United States Patent [19]

Sandstrom

[11] 4,374,941
[45] Feb. 22, 1983

[54] PARTICLE SIZE CONTROL OF SBR/CARBON BLACK POWDER

[75] Inventor: Paul H. Sandstrom, Tallmadge, Ohio

[73] Assignee: The Goodyear Tire & Rubber Company, Akron, Ohio

[21] Appl. No.: 297,035

[22] Filed: Aug. 27, 1981

[51] Int. Cl.³ .............................. C08J 3/16; C08J 3/22; C08K 3/04; C08K 9/04
[52] U.S. Cl. .................................... 523/206; 523/334; 523/352; 524/495; 524/904
[58] Field of Search ............... 260/42.55, 42.47, 42.56, 260/34.2, 42.57; 523/206, 334, 352; 524/495, 904

[56] References Cited

U.S. PATENT DOCUMENTS

| | | | |
|---|---|---|---|
| 3,042,633 | 7/1962 | White | 523/206 |
| 3,079,360 | 2/1963 | Sutherland, Jr. et al. | 523/352 |
| 3,813,259 | 5/1974 | Neubert | 427/222 |
| 3,907,734 | 9/1975 | Ten Broeck et al. | 260/42.55 |
| 3,929,707 | 12/1975 | Berg et al. | 260/42.55 |
| 4,065,426 | 12/1977 | Yamawaki et al. | 260/34.2 |
| 4,073,755 | 2/1978 | Berg et al. | 260/42.55 |
| 4,105,464 | 8/1978 | Oswald et al. | 260/42.55 |
| 4,250,082 | 2/1981 | Sommer et al. | 260/42.55 |

*Primary Examiner*—Allan Lieberman
*Attorney, Agent, or Firm*—J. Y. Clowney; A. T. Rockhill

[57] ABSTRACT

There is disclosed a process for the production of tack-free, pourable, filler containing elastomer powder which comprises (a) dispersing a carbon black filler in water;
(b) mixing the thus dispersed carbon black filler with an elastomer latex;
(c) coagulating the thus produced mixture of elastomer latex and carbon black with a two-stage coagulation solution;
(d) partitioning the thus coagulated suspension with a coating resin; and
(e) filtering, washing and drying of the resultant powder, the improvement comprising using as a coating resin a mixture of a styrene/butadiene resin and a styrene/α-methylstyrene or a polystyrene resin wherein the weight ratio of the styrene/butadiene resin to the styrene/α-methylstyrene or polystyrene resin ranges between 4/1 and 1/4, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to 1/2, and wherein the coagulation temperature ranges from 70° to 90° C., and a further improvement of using the coagulating step in (c) a two-step coagulating process, the first being acid/salt and then next using an acid/alum coagulating solution.

9 Claims, No Drawings

PARTICLE SIZE CONTROL OF SBR/CARBON BLACK POWDER

BACKGROUND OF THE INVENTION

The present invention relates to a process of obtaining solid elastomeric products, containing a filler, in the form of dry free flowing powders which do not conglomerate or experience flaking or separation of the resin coating or filler during storage and handling and which can be used for injection molding of elastomeric articles. To incorporate a filler into an elastomer normally requires the use of rolling mills or internal mixers. The operation of these machines require large expenditures of energy. In these times of energy shortages it was desirous to find a method of avoiding large energy expenditures. It was for this reason an investigation was made for a method of incorporation of a filler into an elastomer to form a pourable powder without resorting to these high energy using machines. It was also of interest to convert the rubber to a form in which automated equipment could be used in handling the product during processing.

A large number of references are cited which deal with pulverulent elastomeric mixtures and with the possibilities of pulverized elastomer technology. Only recently have methods been disclosed for making pulverulent pourable elastomer mixtures such as elastomer-carbon black mixtures.

U.S. Pat. Nos. 3,920,604 and 3,945,978 describe a process of preparing an elastomer containing a filler by emulsifying a solvent solution of the elastomer and the filler, flashing off the solvent and coagulating the mixture to a pourable powder.

Also of interest is U.S. Pat. No. 4,073,755, which describes a process for the production of pulverulent, tack-free, pourable filler-containing elastomer particles by precipitating a stable emulsified homogeneous mixture of an aqueous elastomer emulsion and an aqueous dispersion of a solid filler in the presense of sodium silicate, separating the thus precipitated elastomeric mixture from water and drying the mixture to a tack-free powder. Although this method initially gives a tack-free powder, the powder tends to conglomerate on storage when exposed to the atmosphere. This is probably caused by the silicic acid used to coagulate the mixture. After coagulation the resultant acid solution is neutralized to form a salt which is partly incorporated in the elastomer-filler powder and is not readily removed, even by washing. When exposed to the atmosphere the resultant salt deliquesces causing the particles to conglomerate.

A method of making a resin encapsulated elastomer is described in U.S. Pat. No. 3,813,259. In that invention the rubber is coated with a resin partitioning agent by agglomerating the resin from its latex at a specific temperature which must be within 5° C. of the agglomeration temperature of the resin. This temperature is critical for the adherence of the resin coating to the elastomer.

According to the present invention the preceding problems with the products and processes are eliminated. The pulverulent elastomer when exposed to the atmosphere on storage remains dry and does not conglomerate. The elastomer slurry can be coated with this resin in a wider temperature range and at one much lower than the agglomeration temperature without flaking or separation of the resin from the elastomer. The invention also incorporates the carbon black into the elastomer without the use of high energy equipment.

SUMMARY OF THE INVENTION

In a process for the production of tack-free, pourable, filler containing elastomer powder which comprises
 (a) dispersing a carbon black filler in water;
 (b) mixing the thus dispersed carbon black filler with an elastomer latex;
 (c) coagulating the thus produced mixture of elastomer latex and carbon black with a two-stage coagulating solution;
 (d) partitioning the thus coagulated suspension with a coating resin; and
 (e) filtering, washing and drying of the resultant powder, the improvement comprising using as a coating resin a mixture of a styrene/butadiene resin and a styrene/α-methylstyrene or a polystyrene resin wherein the weight ratio of the styrene/butadiene resin to the styrene/α-methylstyrene or polystyrene resin ranges between 4/1 and 1/4, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to 1/2, and wherein the coagulation temprature ranges from 70° to 90° C. and a further improvement of using the coagulating step (c) a two-step coagulating process, the first being acid/salt and then next using an acid-/alum coagulating solution.

DETAILED DESCRIPTION

The elastomers to which this invention is particularly applicable are all synthetic elastomeric polymers in the form of latices. Representative of these polymers are styrene/butadiene rubbers, acrylonitrile/butadiene rubbers, polypropylene rubbers, polybutadiene rubbers, polyisoprene rubbers, and copolymers of dimethyl butadiene/butadiene rubbers. As previously noted the elastomers are in the form of a latex. The elastomers may be oil-extended and contain other ingredients such as antioxidants.

The carbon black fillers used in this invention are generally the reinforcing type such as high abrasion furnace (HAF), intermediate super abrasion furnace (ISAF), and fast extrusion furnace (FEF). The carbon black, if pelletized, must first be reduced to a powdered form from the usual pelletized form. This is done by mixing the pelletized carbon block with the water and with or without dispersant in a high speed mixer. Although the carbon black can be dispersed without dispersant, a dispersant may be used. If a dispersant is employed, a purified free acid pine lignin dispersant (Indulin TM AT) is used in 3 to 6 percent by weight concentration based on the carbon black. The lignin dispersant is solubilized with a small amount of NaOH.

The dispersed carbon black is then incorporated into the elastomer latex. The use of this procedure prevents the conglomeration of the dried elastomeric product and the formation of any free carbon black.

The coating resins used for practicing this invention are a combination of two types. The use of two types of resins imparts a synergistic effect to the final product.

These resins consist of a styrene/butadiene (S/B) resin with a styrene to butadiene weight ratio of 75/25 to 95/5 in combination with a styrene/α-methylstyrene (S/M) resin with a styrene to α-methylstyrene weight ratio of 99/1 to 50/50. A pure polystyrene resin (PS) may be used instead of the S/M resin. The combination of both resins allows a higher temperature for drying and causes the S/M resin to adhere without flaking. The ratio of the SB resin to the S/M or PS resin may vary between 1/4 and 4/1 is used as a latex at a solid content of about 2 to 10 weight percent, preferably 2 to 5 percent. When equal amounts of the two coating resins are used, as little as 2 parts per hundred rubber (phr) will give a free flowing powder with no free resin, no conglomeration of the powders, high density and small particle size distribution. At least 4 and up to 8 parts per hundred of rubber of the mixture of resins can be used but the excess is usually unnecessary.

There are added to these mixtures of partitioning resins, two surfactants, one surfactant being sodium lauryl sulfate (SLS) and a nonionic type, isooctyl phenoxy polyethoxy ethanol containing 10 moles of ethylene oxide in the polyethoxy portion thereof (Triton TM X-100). This mixture of surfactants is added in concentrations of 4 to 8 weight percent based on the total weight of resin and are in a weight ratio of SLS to Triton TM X-100 of 2/1 to 1/2. It has been found that this mixture of surfactants is required to prevent the resin from becoming dislodged from the resin coated polymer particles and, thus, allowing the finished product to contain free resin.

The mixture of coating resins is added to the coagulated rubber latex carbon black slurry while maintaining the coagulation temperature in the 70° to 90° C. range.

The use of salt/acid or alum/acid as a coagulant are known to have been used as in coagulating elastomers, each being used separately. However, in this invention the method, the amounts and the concentrations of salt/acid and alum/acid and the steps employed in the coagulation process are quite different from the known processes and are quite specific. The elastomer-filler latex mixture is coagulated by the use of a dilute acid/-salt solution at a pH of 3 to 5 at various temperatures and ratio of the coagulant to elastomer. At the conclusion of the first stage salt/acid coagulation there is used the second coagulant which is composed of alum/acid. Sufficient alum is added to give a concentration of 1 to 10 parts of alum per 100 parts of rubber.

The desired results of this invention are obtained when a dilute resin latex coagulation on the elastomer-filler particles in the slurry. This is achieved by adding a dilute resin mixture latex, 2 to 10, preferably 2 to 5 solids, to the dilute coagulant 0.01 to 2 percent by weight in the water in which the particles are slurried. The temperature should be maintained in the 70° to 90° C. range during coagulation of the resins.

The coagulation temperature is not required to be within 5° C. of the agglomerating temperature of the coating resins. Thus, less heat energy is used to produce free-flowing powders having resin coatings of high heat distortion temperatures which should exhibit better storage stability. The procedure outlined in U.S. Pat. No. 3,813,259 would require temperatures at or above 100° C. to effectively coat the powders with resins of the styrene/α-methylstyrene copolymer type. Even if one considers the case where the ratio of styrene to α-methylstyrene is 100/0, which is polystyrene, the agglomeration temperature of 106° C. as presented in U.S. Pat. No. 3,813,259 would require a resin coating step process at temperatures of about 100° C., which is clearly above over temperature range 70° to 90° C. A styrene/α-methylstyrene copolymer haing a 75/25 weight percent monomer charge ratio would be expected to exhibit a higher agglomeration temperature than polystyrene, since it exhibits a glass transition temperature, Tg, above 110° C. as compared to a value of about 95° C. for polystyrene. The Tg of a resin relates to a specific temperature at which it loses its hardness or brittleness and becomes more flexible and takes on rubber-like properties. Using these particular resins in a process of resin coating according to U.S. Pat. No. 3,813,259 would require resin coating temperatures above 100° C. Operating at these temperatures with an aqueous system would require closed high pressure vessels and add substantially to the cost of the resin coating process.

The use of salt/acid or alum as coagulants is presently known. In this invention a two-stage coagulation process is used which requires specific amounts of salt and alum and specific pH conditions. In the first stage of coagulation a mixture of elastomer latex and carbon black is coagulated by the use of a dilute salt/acid solution at pH 3-5 at various temperatures and ratios of salt to elastomer. The temperature of coagulation can vary from 30° to 90° C. and the concentration of salt varies between 2-20 parts per hundred of rubber. The preferred temperature is 40° to 70° C. and the preferred concentration of salt is 4-10 parts per hundred of rubber. The concentration of the salt solution may vary between 0.1 and 1.0 percent. The elastomer-filler particles are maintained as an aqueous slurry with agitation during this first stage of coagulation. During the second stage of coagulation, which involves the resin coating process, the temperature of coagulation can vary between 60° to 90° C. At the conclusion of the first stage and prior to the addition of resin latex, sufficient alum is added to give a concentration of 1 to 10 parts of alum per hundred parts of rubber, with the preferred range being 2 to 5 parts of alum per hundred parts of rubber. After addition of alum the pH of the alum coagulant solution is adjusted to 2-3 pH with dilute sulfuric acid and maintained at this pH range during the entire process of resin coating. The desired results of this invention are obtained when a dilute resin latex coagulates on the elastomer-filler particles during the second stage of coagulation. This is achieved by adding a dilute resin mixture, 2 to 10 percent solids, to the coagulated particles which were formed during the first stage of coagulation.

EXAMPLE 1

A. Preparation of Carbon Black Dispersion

A fluid dispersion (10 percent by weight carbon black) containing 6 parts Indulin TM AT per hundred parts carbon black was prepared by mixing the following composition for 60 minutes in an Eppenbach TM mixer.

|  | Weight (parts) |
|---|---|
| HAF carbon black | 1.0 |
| Indulin TM AT Solution | .4 |
| Water | 8.6 |

The Indulin ™ AT solution (15% by weight total solids) was prepared by adding 10 parts sodium hydroxide to water at 50°–60° C. and slowly mixing in 100 parts Indiulin ™ AT. The sodium hydroxide is added to solubilize the Indulin ™ AT.

B. Mixture of Carbon Black Dispersion and SBR Latex

SBR 1712 latex (72/25 butadiene/styrene monomer charge; 23% solids) containing a hindered phenol antioxidant was slowly added with gentle low-shear stirring to the carbon black dispersion to give the following compound composition.

| | |
|---|---|
| SBR elastomer (dry weight) | 200 grams |
| HAF Carbon Black | 160 grams |
| Indulin ™ AT | 9.6 grams |
| Antioxidant | 2.5 grams |

C. Preparation of Powdered Rubbers

Several mixtures of the above SBR latex and carbon black dispersion were separately added into a vigorously stirred coagulant solution containing 2 liters of water at 50° C., using the coagulants listed in Table 1. The resultant slurries of coagulated elastomer-filler particles were resin coated with 600 milliliters of a 2% solids resin latex consisting of a 50/50 blend of a 90/10 by weight styrene/butadiene resin and a 75/25 by weight styrene/α-methyl styrene resin. The resin latices contained 3 parts of potassium fatty acid soap and also 6 parts each of sodium lauryl sulfate and Triton ™ X-100 per 100 parts of resin. Before the slow addition of the resin latex to the coagulated particles the temperature of the water was increased to 80° C., pH adjusted to 2.5 with sulfuric acid, and where indicated 10 grams of alum was added prior to the resin coating step. Following completion of the resin coating process, the coated particles were filtered hot, washed with cold water and dried on trays in a forced draft oven at 80° C., for aboat 4 hours. After removal from the drying oven, the powdered rubber samples were examined for conglomeration and the presence of free resin.

The results in Table 1 show that use of an acid-alum coagulant during the first stage of coagulation produces after the second stage of coagulation, a powder whose particle size is 98 percent by weight below 1000 microns. The addition of 5 to 10 grams of sodium chloride during the first stage of coagulation to produce a salt-acid-alum coagulant produces a slight increase in particle size, but still 95 percent by weight of the particles are below 1000 microns. However, the use of a two-stage coagulation process produces a dramatic increase in particle size. During the first stage of coagulation, which involves coagulation of the rubber latex/carbon black mixture a salt-acid coagulant is used. After completion of this first stage of coagulation and prior to the addition of resin latex, a small amount of alum (10 grams) is added, the pH is adjusted to 2.5 with sulfuric acid and the water temperature is increased to 80° C. The results in Table 1 clearly show the increase in particle size. At various pH ranges of coagulation between 2 and 7 and in the presence of 10 grams of sodium chloride (NaCl) the particle size has increased to give 40 to 51 percent by weight above 1000 microns. At the 4 to 5 pH range, an increase in salt level from 10 to 20 grams causes a weight percent particle size increase from 51 to 92 percent above 1000 microns. Using the 4 to 5 pH range and a salt level of 10 grams an attempt was made to produce a resin coated powder without the addition of alum prior to the resin coating step. The product isolated from the drying oven was completely conglomerated into one large continuous mass.

Thus, the particle size control is obtained by using a two-stage coagulation process. The first stage involves salt-acid coagulation of the rubber latex/carbon black mixture and the second involves the addition of alum prior to the resin coating step.

TABLE 1

| Coagulation, 2000 ml H₂O, 50° C. | | | | Resin Coating* 80° C. | Particle Size, Microns (% by weight) | | | |
|---|---|---|---|---|---|---|---|---|
| Coagulant | pH | Alum gms | NaCl gms | Alum Added gms | >2000 | 2000 to 1000 | 1000 to 300 | 300 to 75 |
| Acid-Alum | 2.5 | 10 | 0 | 0 | 0 | 2 | 51 | 47 |
| Salt-Acid-Alum | 2.5 | 10 | 5 | 0 | 0 | 5 | 69 | 26 |
| Salt-Acid-Alum | 2.5 | 10 | 10 | 0 | 0 | 4 | 64 | 32 |
| Salt-Acid | 2-3 | 0 | 10 | 10 | 7 | 33 | 52 | 8 |
| Salt-Acid | 4-5 | 0 | 10 | 10 | 12 | 39 | 44 | 5 |
| Salt-Acid | 4-5 | 0 | 20 | 10 | 55 | 37 | 8 | 0 |
| Salt-Acid | 6-7 | 0 | 10 | 10 | 14 | 31 | 53 | 2 |
| Salt-Acid | 4-5 | 0 | 10 | 0 | — | — | — | — |

*All samples gave no evidence of free resin after removal from the drying oven.

EXAMPLE 2

A. Preparation of Carbon Black Dispersion

A fluid dispersion (5 percent carbon black by weight) was prepared by grinding HAF carbon black in water for 20 minutes in a Littleford mixer.

B. SBR Latex and Carbon Black Dispersion

The 5 percent carbon black dispersion was slowly added with gentle low-shear stirring to SBR 1712 latex (75/25 butadiene/styrene monomer charge; 20% solids) containing Wingstay ™ 29 antioxidant to give the following composition:

| | |
|---|---|
| SBR Elastomer (dry weight) | 2440 grams |
| HAF Carbon Black | 1952 grams |
| Wingstay 29 | 48.8 grams |

C. Primary Particle Formation/1st Stage Coagulation

A schematic of the powdered rubber preparation unit used to prepare the described approximate 10 pound samples is shown in FIG. I. Eighteen liters of water was added into the coagulation vessel. Live steam was added into the coagulation vessel until the temperature reached 60° C. The total volume of water was adjusted after heating to twenty liters. At this point the desired amount of salt (sodium chloride) was added and the pH adjusted to the desired range with dilute sulfuric acid.

produced an agglomerated product in the drying oven.

TABLE 2

| Series | 1st Stage Coagulation Primary Particle Formation | | 2nd Stage Coagulation Resin Coating* | Particle Size, Microns (% by weight) | | |
|---|---|---|---|---|---|---|
| | NaCl, gms | pH Range | Alum, gms | >1000 | 1000–500 | <500 |
| A | 100 | 3.5–4.0 | 60 | — | — | — |
| | 200 | 3.5–4.0 | 60 | 2 | 38 | 60 |
| | 300 | 3.5–4.0 | 60 | 10 | 40 | 50 |
| | 500 | 3.5–4.0 | 60 | 5 | 31 | 64 |
| B | 200 | 4.0–4.5 | 80 | 27 | 71 | 2 |
| | 400 | 4.0–4.5 | 80 | — | — | — |
| C | 200 | 3.5–4.0 | 60 | 2 | 13 | 85 |
| | 200 | 3.5–4.0 | 90 | 2 | 19 | 79 |
| | 200 | 3.5–4.0 | 120 | — | — | — |
| | 200 | 3.5–4.0 | 150 | — | — | — |

*pH at 2.5

The premix of carbon black dispersion and SBR latex after stirring for 10 minutes at 175 rpm was slowly added over a period of 20 minutes into the coagulator which was stirring at 250 rpm. During the 20 minutes of premix addition the temperature was maintained at 60° C. and pH at the indicated range. The amounts of salt and pH ranges are indicated in Table 2.

D. Resin Coating/2nd Stage Coagulation

After completion of the premix addition, the temperature in the coagulation vessel was increased to 80° C. The amount of alum indicated in Table 2 was then added and the pH adjusted to 2.5 with dilute sulfuric acid. A 2 percent by weight solids resin coating latex was added over a period of 10 minutes. The resin latex consisted of 3 parts 95/5 by weight styrene/butadiene resin and 1 part polystyrene resin per 100 parts of rubber. The resin latex also contained 3 parts of potassium fatty acid soap and 6 parts each of sodium lauryl sulfate and Triton TM X-100 per 100 parts of resin. After completion of the resin addition, the powdered rubber slurry was filtered on a screen, drained and washed with several volumes of water. It was then placed on trays and dried for approximately 14 hours in a 70° C. air circulating oven. The results in Table 2 indicate clearly that the amount of salt and pH range are extremely critical for obtaining a free-flowing product. In Series A, the use of 100 grams of salt in the pH range of 3.5 to 4.0 during the first stage of coagulation produced a powdered rubber product which became totally conglomerated during oven drying. The use of higher levels of salt between 200 and 500 grams produced excellent free-flowing powders. The amount of salt used does not appreciably affect the particle size of the powders. This is in sharp contrast to the data presented in Example 1 which showed the effect of salt on particle size when Indulin TM AT was present as a dispersant in the carbon black dispersion. In the studies involving carbon black dispersions without added dispersant, it has been found that at equivalent salt levels an increase in coagulation pH range will cause an increase in particle size. In Series B the use of 200 grams of salt at the higher pH range did produce a larger particle size powder than obtained when using 200 grams of salt in Series A. It is also shown in Series B that the use of 400 grams of salt in the pH range of 4.0 to 4.5 produced an aggomerated product in the drying oven. In Series C the effect of alum level on the disposition of the powder is shown. When using a salt level of 200 grams in a pH range of 3.5–4.0, the use of 60 or 90 grams of alum in the second stage of coagulation produced an excellent free-flowing powder. However, the use of 120 or 150 grams of alum produced an agglomerated product in the drying oven.

The elastomer film particles prepared in accordance with this invention after drying, form free-flowing powders which have particle sizes up to 5 milliliters in diameter. It is preferred, however, that the majority of the free-flowing powders formed in accordance with this invention produce powders which are above 1 milliliter in diameter and not greater than 2 milliliters in diameter.

This invention is also directed to the compositions prepared in accordance with the process described in the Summary of the Invention.

Attention is called to my copending application entitled, "Free Flowing SBR Black Masterbatch Powder," filed on even date here as U.S. Ser. No. 297,287, whose total disclosure is incorporated herein by reference.

While certain representative embodiments and details have been shown for the purpose of illustrating the invention, it will be apparent to those skilled in this art that various changes and modifications may be made therein without departing from the scope of the invention.

I claim:

1. A process for the production of tack-free, pourable, filler containing elastomer powder which comprises
   (a) dispersing a reinforcing type carbon black filler in water, said carbon black being selected from the group consisting of high abrasion furnace (HAF), intermediate super abrasion fuurnace (ISAF), and fast extrusion furnace (FEF),
   (b) mixing the thus dispersed carbon black filler with an elastomer latex, said latex being selected from the group of styrene/butadiene rubbers, acrylonitrile/butadiene rubbers, polypropylene rubbers, polybutadiene rubbers, polyisoprene rubbers, and copolymers of dimethyl butadiene/butadiene rubbers, the improvement comprising
   (c) coagulating the thus produced mixture of elastomer latex and carbon black with a two-stage coagulating process, comprising first coagulating the mixture of elastomer latex and carbon black by the use of a dilute salt/acid solution at a pH 3–5, at temperatures varying from 30 to 90° C. wherein the concentration of salt varies between 2–20 parts per hundred of rubber, and the concentration of the salt in the solution may vary between 0.1 and 1.0 percent, and then conducting the second stage coagulation of the mixture by adding sufficient alum to give a concentration of 1 to 10 parts of alum per 100 parts of rubber, adjusting the pH of the mixture to a pH of 2 to 3 with dilute sulfuric acid, (d) partitioning the thus coagulated suspension with a coating resin by adding a dilute solution of a coating resin to the coagulated particles formed during the first stage coagulation while maintaining the temperature between 70° C. and 90° C. and (e) filtering, washing and drying the resultant powder dispersion, an additional improvement comprising using as a coating resin a mixture of a styrene/-butadiene resin and a styrene/α-methylstyrene or a polystyrene resin wherein the weight ratio of the styrene/butadiene resin to the styrene/α-methylstyrene or polystyrene resin ranges between 4/1 and 1/4, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to 1/2.

2. A process according to claim 1 wherein the carbon black is prepared using a purified free acid pine lignin dispersant in an amount which is 3 to 6 percent by weight concentration based on the weight of the carbon black.

3. A process according to claim 1 in which the styrene/butadiene resin contains a styrene to butadiene weight ratio ranging from 75/25 to 95/5 and the styrene/α-methylstyrene resin contains a styrene to α-methylstyrene weight ratio of 99/1 to 50/50.

4. A process according to claim 2 in which the styrene/butadiene resin contains a styrene to butadiene weight ratio ranging from 75/25 to 95/5 and the styrene/α-methylstyrene resin contains a styrene to α-methylstyrene weight ratio of 99/1 to 50/50.

5. A process according to claim 1 wherein the styrene/butadiene resin has a styrene to butadiene weight ratio of 90/10 and the styrene/α-methylstyrene resin has a styrene to α-methylstyrene weight ratio of 75/25.

6. A process according to claim 2 wherein the styrene/butadiene resin has a styrene to butadiene with ratio of 90/10 and the styrene/α-methylstyrene resin has a styrene to α-methylstyrene weight ratio of 75/25.

7. A process according to claim 1 in which the styrene/butadiene resin contains a styrene to butadiene weight ratio of 95/5 and the second resin is polystyrene.

8. A process according to claim 2 in which the styrene/butadiene resin contains a styrene to butadiene weight ratio of 95/5 and the second resin is polystyrene.

9. As the composition the tack-free, pourable, filler containing elastomer powder which is prepared in accordance with the process of claim 1.

* * * * *